United States Patent Office 3,439,958
Patented Apr. 22, 1969

3,439,958
CONTROL VALVE IN PRESSURE MEDIUM BRAKE DEVICES OF VEHICLES APPLICABLE IN ONE-CONDUIT-, AS WELL AS TWO-CONDUIT-OPERATIONS
Hans Gruner, Heidelberg-Wieblingen, and Heinz Nicolay, Heidelberg, Germany, assignors to Graubremse G.m.b.H., Heidelberg, Germany, a corporation of Germany
Filed May 24, 1966, Ser. No. 552,489
Claims priority, application Germany, Dec. 31, 1965, G 45,614
Int. Cl. B60t 15/02, 17/04, 11/02
U.S. Cl. 303—40                 12 Claims

ABSTRACT OF THE DISCLOSURE

A control valve in pressure medium brake devices of vehicles, applicable in one-conduit, as well as in two-conduit operations, which comprises a closed housing, a separation wall dividing the housing into a brake chamber and an operating chamber and a brake piston received and reciprocating in the brake chamber. A control piston reciprocates in the operating chamber. The brake chamber includes branches for connection with a brake cylinder by means of a brake conduit. The working chamber includes branches for a supply line and a control line and for connection with an air supply container. A piston rod is axially movable in the closed housing and connects floatingly the control pistons. An air inlet valve member is mounted on the separation wall and operated by the control piston. An inner housing includes the separation wall and is removably disposed in the closed housing, and the control piston and a part of the valve member is carried by and exchangeably removable jointly with the inner housing.

---

The present invention relates to a control valve in pressure-fluid brake systems of vehicles which can be used both in one-conduit and in two-conduit operations.

Such valves customarily have a housing which is divided by a partition wall into two chambers, namely one braking chamber receiving a control piston and having branches for a brake cylinder and a brake conduit, and an operating chamber for a control piston, which, in case of two-conduit operation, acts as emergency brake piston whereby the operating chamber has branches for the storage- and control conduit and the air storage container. The two pistons are connected together in overhung manner with each other by a piston rod which passes through the partition wall. The operating chamber, on the other hand, has a connection for the supply and control conduit, respectively, and another connection for the air storage container. Finally, in the partition wall of the housing there is provided an inlet and outlet valve actuated by the control piston. This complicated structure gives rise to difficulties, particularly if worn parts must be replaced. When repairs are made, the entire valve must be removed from the vehicle, whereby the connecting conduits must be removed and secured and, if required, the inner operating surfaces provided in the valve housing have to be reground.

It is one object of the present invention to provide a control valve in pressure-fluid brake systems, wherein the drawbacks of the known structures are prevented.

It is another object of the present invention to provide a control valve in pressure-fluid brake systems, wherein parts and pistons, respectively, constituting elements of the valve and in particular the parts, which are subject to wear in a two-conduit operation, are arranged in a separate inner housing which at the same time forms the partition wall and can be removed with the entire valve- and piston-system from the actual valve housing, without it being necessary to disconnect the connecting conduits. Repairs to be made on the individual parts of the valve or the replacement of worn parts can be effected in a shop after a suitable replacement unit has previously been inserted into the valve housing remaining in the vehicle.

The inner housing is developed to particular advantage in the form of a pot and preferably is stamped out or drawn from sheet metal. The bottom of the pot forms in this embodiment the partition wall, which subdivides the valve housing, and the walls form a cylinder for the control piston. This inner-housing pot is inserted in a sealing manner in a corresponding recess of the outer housing which consists for instance of cast iron.

It is yet another object of the present invention to provide a control valve in pressure-fluid brake ssytems, wherein the two control pistons arranged in the valve are suitably arranged so as to operate in opposition to each other in case of double-conduit operation. The control piston, which operates in the inner housing, can be formed as a double piston, whereby the outer piston part in the case of indirect trailer brake control with pressure reduction is provided with a stop to limit the stroke of the inner piston.

With these and other objects in view, which will become apparent from the following detailed description, the present invention will be clearly understood in connection with the accompanying drawings, in which.

Figure 1:
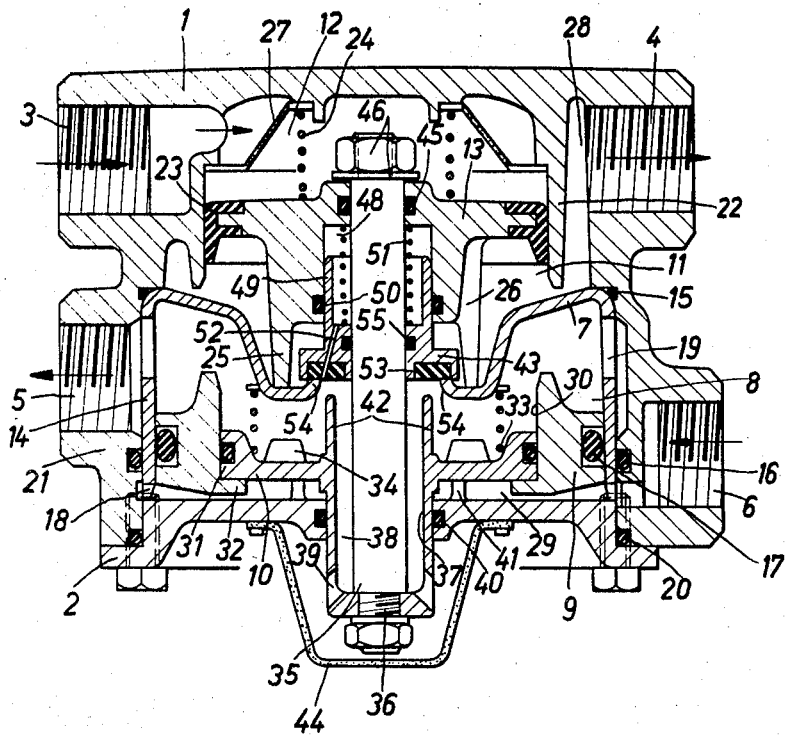
FIGURE 1 is an axial section of the control valve, designed in accordance with the present invention.

Referring now to the drawings and in particular to FIG. 1, the entire valve arrangement is contained in a housing 1, which is provided with a screwed-on cover 2, a connecting branch 3 for a supply and control line, respectively, a branch 4 for the air supply container disposed on the trailer vehicle, a branch 5 for the connection of the conduits leading to the brake cylinders and a branch 6 for the brake conduit in case of two-conduit brake operation and for an air filter in case of one-conduit operation, respectively.

The housing 1 is subdivided by a partition wall 7 into a brake chamber 8 having control piston 9, 10, respectively, therein and a working chamber 11 and 12 for another control and emergency-brake piston 13, respectively.

The partition wall 7 is formed by the bottom of a pot-shaped inner housing 14 which, with the interposition of packing rings 15 and 16 is inserted sealingly in the lower part of the housing 1 and is retained in position and closed by the cover 2. A packing 20 is provided between the cover and the housing.

The inner housing 14 is provided in its walls with openings 18 and 19 and is otherwise formed as a cylinder, in which the piston part 9 having a piston packing 17 is guided.

In the upper part of the housing 1 within the working chamber 11 and 12, there is formed a guide cylinder 22 for the control and emergency-brake piston 13, respectively, whereby the piston 13 bears on its periphery a lip ring 23 around which flows the supply air entering under circumstances through the branch 3.

A compression spring 24 tends to set the piston 13 with its feet 25 against the partition wall 7. On the other hand, the feet 25 leave free between them passages 26 for the passage of the air to be described later. Above the piston 13, there is provided in the work chamber 12 a filter 27 for the cleaning of the air entering through the supply branch 3 into the chamber 12. The supply-container branch 4 is connected via the channel 28 with the chamber 11 disposed below the control- and emergency-brake-piston 13. The brake cylinder connecting branch 5 is connected via the openings 19 with the part of the brake chamber 8, above the control piston 9 and 10 and the brake-conduit connecting branch 6 is in communication via the openings 18 with the part 29 of the brake chamber 8 which is disposed below the control piston 9 and 10.

The control piston 9 and 10 is a double-piston, the outer piston part 9 forming a guide cylinder 30, in which the inner piston part 10 is guided with the interposition of a piston ring 31. On the piston part 9, there is provided a collar 32 against which the inner piston part 10 is pressed by a compression spring 33, which in turn rests against the partition wall 7 and a projection provided thereon, respectively.

At its top, the piston part 10 carries stops 34 which limit the upward movement of the piston 10 by abutting against the partition wall 7.

The two control pistons 9 and 10 and 13, respectively, are connected floatingly with each other by a piston rod 35 which passes through the partition wall 7. In the embodiments disclosed in FIGS. 1 and 3, the piston rod 35 is rigidly connected by a screw thread 36 with a bushing 37 formed on the piston 10, there being provided in the bushing 37 along the piston rod 35 air passage channels 38 and in the bushing 37 air outlet openings 39, respectively. On the other hand, the bushing 37 passes through the housing cover 2. It is guided in a guide 40 provided therein in the manner of a piston rod.

On the inside of the cover 2, there are abutment members 41 against which the piston 10 can engage in its lowermost end position.

The upper edge 42 of the bushing 37, which protrudes beyond the piston 10, forms, in combination with a valve body 43 guided on the piston rod 35, an outlet valve seat which permits air contained in the chamber 8 to emerge into the atmosphere via the opened seat of the valve body 43, the channels 38 and the openings 39. A filter 44 mounted on the cover 2 protects the valve from dirt, which might be contained in the entering air.

Figure 3:
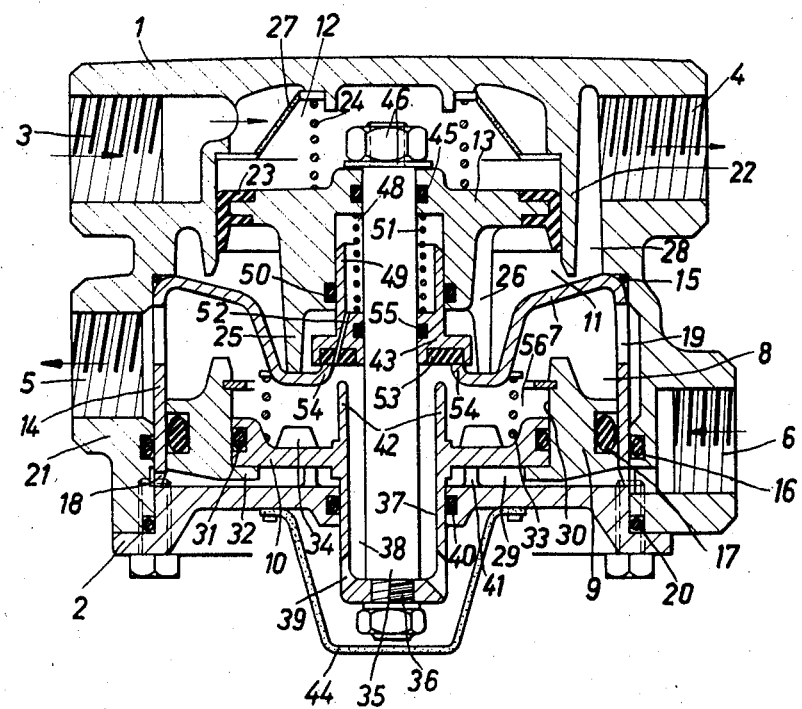
FIG. 3 is an axial section of a third embodiment of the control valve.

In the embodiment of the control valve disclosed in FIGS. 1 and 3, the piston 13 is axially displaceable with the use of a ring packing 45 provided on the piston rod 35 and is limited in its movement by a nut and disc 46, respectively.

Figure 2:
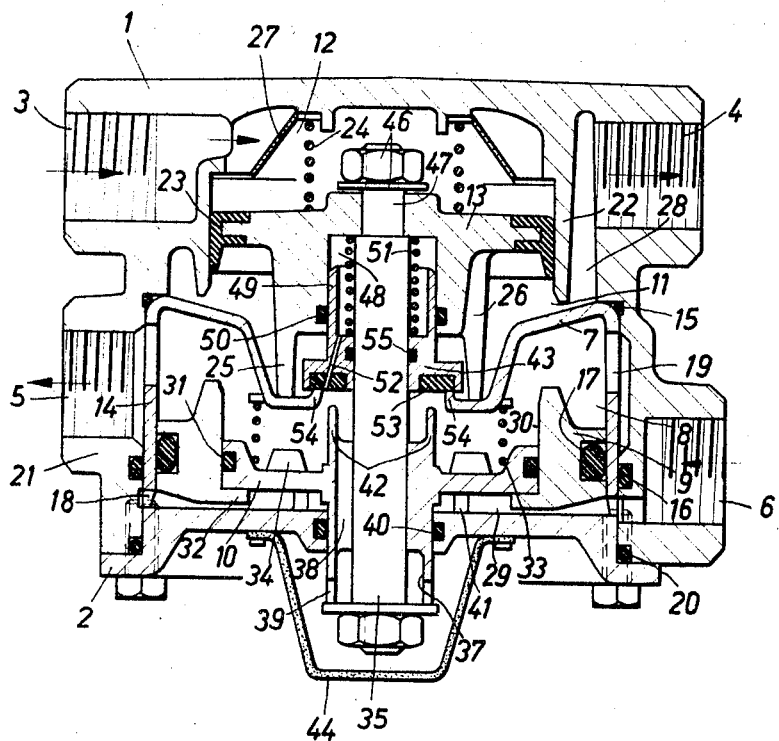
FIG. 2 is an axial section of another embodiment of the control valve.

In the embodiment disclosed in FIG. 2, on the other hand, the piston part 10 is axially displaceable on the piston rod 35, while the nut 46 connects the piston 13 rigidly with the set-off part 47 of the piston rod 35.

In this embodiment, the lower control piston 9 and 10 is arranged overhung with the piston rod 35, the bushing 37 having air-outlet openings 39".

Within the control and emergency-brake piston 13, there is provided a cylindrical chamber 48, in which the valve body 43 is guided by means of a cylindrical extension 49 with the interposition of a ring packing 50 and a compression ring 51.

In the valve body 43, a passage channel 52 can be provided. On its bottomside, the valve body 43 has an elastic insert 53, which is so large, that the valve body 43 can thereby either place itself on the edge 42 of the valve seat or on the larger inlet seat 54 formed in the partition wall 7. Otherwise, the valve body 43 is guided by means of a ring packing 55 on the piston rod 35.

In the embodiment of the valve disclosed in FIG. 3, there is inserted in the cylindrical guide 30 of the control piston 9 a circlip 56 or a similar abutment member which limits the upward movement of the control piston 10.

The manner of operation of the disclosed control valve is as follows:

In case of two-conduit operation, the supply conduit coming from the tractor vehicle is connected to the branch 3, the air supply container disposed on the trailer is connected to the branch 4, the conduit leading to the brake cylinders is connected to the branch 5, and the brake conduit (not shown) is connected to the branch 6. From the tractor vehicle, the supply air passes via the branch 3 through the filter 27 into the chamber 12 and from there, after flowing around the piston packing 23, into the chamber 11 and finally via the channel 28 and branch 4 to the trailer supply container which is filled in this manner.

When braking is effected, air flows from the tractor vehicle via the brake conduit to the connection 6 and from there via the passage openings 18 into the space 29 below the control piston 9 and 10. The latter moves upwardly. In this connection, the edge 42 of the outlet seat engages the valve body 43 and interrupts the communication with the atmosphere. Upon the further stroke, the valve body 43 is finally lifted from its seat 54 against the action of the spring 51 so that now the supply air can pass from the chamber 11 into the chamber 8 and from there through the openings 19 and the branch 5 into the conduit leading to the brake cylinders and the brakes can be applied. The piston 13 remains thereby in its initial position.

Through the inlet seat 54, there flows into the chamber 8 so much air only which just corresponds to the striking of the piston 9 and 10 on the bottomside of the latter. The valve system thereby passes into the so-called brake shut-off position, in which the two valve seats 54 and 42 are closed.

As soon as the pressure in the brake conduit decreases, the piston 9 and 10 moves back to its initial position and by releasing the outlet seat 42, the piston 9 and 10 vents the conduit leading to the brake cylinders and the chamber 8.

In case of any possible destruction or disconnection of the supply conduit, venting of the valve chamber 12 takes place, so that the control and emergency brake piston 13, respectively, can move upward under the pressure of the air from the storage container. In this connection, it carries upward the inner control piston 10, via the piston rod 35, so that the outlet seat 42 on the valve body 43 is closed and the latter opens the inlet seat 54. This leads to so-called emergency braking, in that the supply air emergency from the chamber 11 can pass via the chamber 8 and the connection 5 into the conduit leading to the brake cylinders.

Upon initiating a braking action, the control line originating from the trailer vehicle is connected to the branch 3 and an air filter is connected to the branch 6. The filling of the trailer supply container connected to the branch 4 is effected in the same manner as previously via the control conduit.

If braking is introduced in the tractor vehicle, the pressure in the control line is lowered and the same braking then takes place, as in the case of the emergency braking described above.

Since the pressure of the control conduit is lowered stepwise, there is also obtained a gradual braking corresponding to the steps.

If the control valve is to be used for brake systems, which have a higher operating pressure in the tractor vehicle braking than in the trailer, then the abutment ring 56 (FIG. 3) applied in the control piston 9, which abutment ring 56 limits the upward stroke of the control piston 10. The connection of the entire valve and the initiation of the braking take place in the same manner as in the case of the initiation braking. As soon as the inlet valve seat 54 is opened, air passes into the chamber 8 and exerts pressure upon the two pistons 9 and 10, whereby the abutment ring 56 of the piston 9 upon its downward travel abuts the piston 10. Corresponding to the area ratio of the piston 13 with respect to the two pistons 9 and 10, reduction in pressure takes place towards the chamber 8, so that only air at a reduced pressure can flow into the conduit leading to the brake cylinders. The ratio can for instance be chosen such, that with a control conduit pressure of about 6 kilograms per square centimeter, air with a pressure of about 4.5 kilograms per square centimeter is applied in the conduit leading to the brake cylinders.

The possibility of carrying out repairs is of particular advantage in the case of this control-valve design. When the cover 2 is removed from the outer housing 1, 21, the entire valve system together with the pot-like housing part 7, 14 and the respective pistons and valve parts can be pulled out of the housing 1 and replaced by another suitable assembly. It is not necessary to disconnect the connections of the different conduits, nor any parts of the piston or valve system. Later on, the worn parts of the valve system can then be replaced in the repair shop. This is of particular advantage in the case of two-conduit operation in which, as is known, the piston 9 or 10 and the cylinders 30 and 14, respectively, are subject to more substantial wear in the course of operation.

We claim:
1. A control valve in pressure medium brake devices of vehicles, applicable in one-conduit, as well as two-conduit operations, comprising
    a closed housing,
    a separation wall dividing said housing into a brake chamber and an operating chamber,
    a brake piston received and reciprocating in said brake chamber,
    a control piston reciprocating in said operating chamber,
    said brake chamber including branches for connection with a brake cylinder by means of a brake conduit,
    said operating chamber including branches for a supply line and a control line and for connection with an air supply container,
    a piston rod axially movable in said closed housing and connecting floatingly said control pistons,
    an air inlet valve member mounted on said separation wall and operated by said control piston,
    an inner housing including said separation wall and removably disposed in said closed housing, and
    said control piston and a part of said valve member being carried by and exchangeably removable jointly with said inner housing.
2. The control valve, as set forth in claim 1, wherein said control piston operates as an emergency brake piston, in case of a two-conduit brake system.
3. The control valve, as set forth in claim 1, wherein said inner housing is of pot-shape and includes a bottom portion and a cylindrical peripheral portion, said bottom portion constituting said separation wall, and said cylindrical peripheral portion constitutes the guide cylinder for said control piston.
4. The control valve, as set forth in claim 1, wherein said inner housing is formed integrally of sheet metal.
5. The control valve, as set forth in claim 1, wherein said closed housing, adapted to remain in said vehicle, has a seat for receiving said inner housing, said piston rod passing through said seat, and
    sealing means disposed between said closed housing and said inner housing.
6. The control valve, as set forth in claim 1, wherein said inner housing has peripheral walls, and
    said peripheral walls have openings at the level of said branch for connection with said brake cylinder and of said branch for connection with said brake conduit, respectively.
7. The control valve, as set forth in claim 1, wherein said inner housing constitutes the brake chamber of said valve and receives said brake piston.
8. The control valve, as set forth in claim 7, wherein said brake piston operating in said brake chamber is a double-piston.
9. The control valve, as set forth in claim 8, wherein said double piston comprises an outer piston and an inner piston,
    said outer piston reciprocates along the inner face of said inner housing and has an inner cylindrical face, and
    said inner piston reciprocates along said inner cylindrical face of said outer piston.
10. The control valve, as set forth in claim 9, wherein said outer piston has an abutment member limiting the relative movement of said inner piston.
11. The control valve, as set forth in claim 10, wherein the diameter of said inner piston has a predetermined ratio relative to the diameter of said outer piston, so that upon exchange of said inner and outer pistons the pressure reduction can be varied.
12. The control valve, as set forth in claim 1, which includes means for operating said pistons in opposite directions, in case of a two-conduit brake system.

References Cited

UNITED STATES PATENTS 2,937,052   5/1960   Gates _____ 303—29
3,240,534   3/1966   Stelzer _____ 303—40 XR FERGUS S. MIDDLETON, Primary Examiner.

J. J. McLAUGHLIN, JR., Assistant Examiner.

U.S. Cl. X.R.

137—106, 627.5; 303—7, 29, 48